United States Patent
Bhogal et al.

(10) Patent No.: US 9,661,069 B2
(45) Date of Patent: May 23, 2017

(54) VIRTUAL WORLD SUBGROUP DETERMINATION AND SEGMENTATION FOR PERFORMANCE SCALABILITY

(71) Applicant: INTERNATIONAL BUSINESS MACHINES CORPORATION, Armonk, NY (US)

(72) Inventors: Kulvir S. Bhogal, Fort Worth, TX (US); Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 13/869,593

(22) Filed: Apr. 24, 2013

(65) Prior Publication Data
US 2013/0238803 A1 Sep. 12, 2013

Related U.S. Application Data

(63) Continuation of application No. 13/431,111, filed on Mar. 27, 2012, now Pat. No. 8,533,733, which is a
(Continued)

(51) Int. Cl.
*G06F 9/50* (2006.01)
*H04L 29/08* (2006.01)
*G06Q 30/00* (2012.01)

(52) U.S. Cl.
CPC ........ *H04L 67/1002* (2013.01); *G06F 9/5083* (2013.01); *G06Q 30/00* (2013.01)

(58) Field of Classification Search
CPC ..................................................... G06F 9/5083
(Continued)

(56) References Cited

U.S. PATENT DOCUMENTS 5,956,038 A 9/1999 Rekimoto
6,009,460 A 12/1999 Ohno et al.
(Continued)

OTHER PUBLICATIONS

Duong et al., "A Dynamic Load Sharing Algorithm for Massively Multiplayer Online Games", The 11th IEEE International Conference on Networks, 2003, ICON2003, Sep. 28-Oct. 1, 2003, pp. 131-136.

*Primary Examiner* — Jacob A Petranek
(74) *Attorney, Agent, or Firm* — Lisa Ulrich; Andrew M. Calderon; Roberts Mlotkowski Safran Cole & Calderon, P.C.

(57) ABSTRACT

A system and method of decreasing server loads and, more particularly, to decrease server load by automatically determining subgroups based on object interactions and computational expenditures. The system includes a plurality of servers; a subgroup optimization module configured to segment a plurality of objects into optimal subgroups; and a server transfer module configured to apportion one or more of the optimal subgroups between the plurality of servers based on a load of each of the plurality of servers. The method includes determining a relationship amongst a plurality of objects; segmenting the objects into optimized subgroups based on the relationships; and apportioning the optimized subgroups amongst a plurality of servers based on server load.

12 Claims, 8 Drawing Sheets

Related U.S. Application Data continuation of application No. 12/111,478, filed on Apr. 29, 2008, now Pat. No. 8,230,441.

(58) Field of Classification Search
USPC .......................................................... 718/105
See application file for complete search history.

(56) References Cited

U.S. PATENT DOCUMENTS

| | | | |
|---|---|---|---|
| 6,020,885 | A | 2/2000 | Honda |
| 6,036,601 | A | 3/2000 | Heckel |
| 6,070,149 | A | 5/2000 | Tavor et al. |
| 6,118,456 | A | 9/2000 | Cooper |
| 6,154,211 | A | 11/2000 | Kamachi et al. |
| 6,256,043 | B1 | 7/2001 | Aho et al. |
| 6,329,986 | B1 | 12/2001 | Cheng |
| 6,346,956 | B2 | 2/2002 | Matsuda |
| 6,396,509 | B1 | 5/2002 | Cheng |
| 6,437,777 | B1 | 8/2002 | Kamachi et al. |
| 6,493,001 | B1 | 12/2002 | Takagi et al. |
| 6,570,563 | B1 | 5/2003 | Honda |
| 6,738,065 | B1 | 5/2004 | Even-Zohar |
| 6,772,195 | B1 | 8/2004 | Hatlelid et al. |
| 6,801,930 | B1 | 10/2004 | Dionne et al. |
| 6,820,112 | B1 | 11/2004 | Matsuda et al. |
| 6,845,486 | B2 | 1/2005 | Yamada et al. |
| 6,928,414 | B1 | 8/2005 | Kim |
| 6,954,728 | B1 | 10/2005 | Kusumoto et al. |
| 6,968,315 | B1 | 11/2005 | Nakisa |
| 6,981,220 | B2 | 12/2005 | Matsuda |
| 7,054,831 | B2 | 5/2006 | Koenig |
| 7,076,445 | B1 | 7/2006 | Cartwright |
| 7,086,005 | B1 | 8/2006 | Matsuda |
| 7,184,047 | B1 | 2/2007 | Crampton |
| 7,412,529 | B2 | 8/2008 | Ryu |
| 8,051,462 | B2 | 11/2011 | Hamilton, II et al. |
| 2001/0020955 | A1 | 9/2001 | Nakagawa et al. |
| 2002/0040327 | A1 | 4/2002 | Owa |
| 2002/0138607 | A1 | 9/2002 | O'Rourke et al. |
| 2003/0005439 | A1 | 1/2003 | Rovira |
| 2003/0080989 | A1 | 5/2003 | Matsuda et al. |
| 2004/0030741 | A1 | 2/2004 | Wolton et al. |
| 2004/0064351 | A1 | 4/2004 | Mikurak |
| 2004/0143495 | A1 | 7/2004 | Koenig |
| 2004/0148221 | A1 | 7/2004 | Chu |
| 2004/0162759 | A1 | 8/2004 | Willis |
| 2004/0193441 | A1 | 9/2004 | Altieri |
| 2005/0015725 | A1 | 1/2005 | Matsuda |
| 2005/0030309 | A1 | 2/2005 | Gettman et al. |
| 2005/0086605 | A1 | 4/2005 | Ferrer et al. |
| 2005/0086612 | A1 | 4/2005 | Gettman et al. |
| 2005/0246711 | A1 | 11/2005 | Berstis et al. |
| 2006/0015904 | A1 | 1/2006 | Marcus |
| 2006/0111979 | A1 | 5/2006 | Chu |
| 2006/0143095 | A1 | 6/2006 | Sandus et al. |
| 2006/0178968 | A1 | 8/2006 | Jung et al. |
| 2006/0178975 | A1 | 8/2006 | Jung et al. |
| 2006/0230407 | A1 | 10/2006 | Rosu et al. |
| 2006/0258462 | A1 | 11/2006 | Cheng et al. |
| 2006/0287105 | A1 | 12/2006 | Willis |
| 2007/0061202 | A1 | 3/2007 | Ellis et al. |
| 2007/0061204 | A1 | 3/2007 | Ellis et al. |
| 2007/0101276 | A1 | 5/2007 | Yuen |
| 2007/0118394 | A1 | 5/2007 | Cahoon |
| 2007/0118420 | A1 | 5/2007 | Jung et al. |
| 2007/0129148 | A1 | 6/2007 | Van Luchene |
| 2007/0156509 | A1 | 7/2007 | Jung et al. |
| 2007/0162863 | A1 | 7/2007 | Buhrke et al. |
| 2008/0076573 | A1 | 3/2008 | Loehrer |
| 2008/0104608 | A1 | 5/2008 | Hyser et al. |
| 2008/0104609 | A1 | 5/2008 | D'Amora et al. |
| 2008/0155537 | A1 | 6/2008 | Dinda et al. |
| 2008/0268418 | A1 | 10/2008 | Tashner et al. |
| 2009/0271205 | A1 | 10/2009 | Finn et al. |
| 2009/0276704 | A1 | 11/2009 | Finn et al. |

VIRTUAL WORLD SUBGROUP DETERMINATION AND SEGMENTATION FOR PERFORMANCE SCALABILITY

FIELD OF THE INVENTION

The invention generally relates to providing a system and method of use to decrease server load and, more particularly, to decrease server load by automatically determining subgroups based on object interactions and computational expenditures.

BACKGROUND OF THE INVENTION

Virtual universes (VUs) are computer-based simulations of the real world where users interact with one another using online identities. These online identities, known as avatars, can be chosen by a user to graphically represent himself within the VU in a human-like form.

A VU is similar in many respects to the real world. VU's can have different geographical locations, time metrics, and assets that may be used similarly to those used in the real world. A VU stores all of this information, including avatar data, on a number of servers. In the past, each server has represented a geographic location within the VU and has also included all of the data for the avatars within the VU's geographic location. Presently, millions of users have participated in VUs and a number of different geographic locations have been created requiring numerous servers to handle the load.

The problem that arises with VUs is that it is difficult to control how much load is on any given server. For example, there may be thousands of avatars in one geographic location and only ten avatars in another location. This causes the server with thousands of avatars to overload and the server with only ten avatars to be underutilized. When a server becomes overloaded, the avatar interactions handled by the overloaded server appear slower than normal to the user. Depending on the degree of overload, the user will become frustrated with the slow speed and leave the VU. This results in fewer users and affects the amount of income that can be generated within the VU.

Accordingly, there exists a need in the art to overcome the deficiencies and limitations described hereinabove.

SUMMARY OF THE INVENTION

In a first aspect of the invention, a system for reducing server loads is provided. The system comprises a plurality of servers, a subgroup optimization module configured to segment a plurality of objects into optimal subgroups, and a server transfer module configured to apportion one or more of the optimal subgroups between the plurality of servers based on a load of each of a plurality of servers.

In another aspect of the invention, a method comprises reducing server load by determining a relationship amongst a plurality of objects; segmenting the objects into optimized subgroups based on the relationships; and apportioning the optimized subgroups amongst a plurality of servers based on server load.

In another aspect of the invention, a method for deploying an application for reducing server loads is provided. The computer method comprises a computer infrastructure being operable to: segment a plurality of objects into a plurality of subgroups; and transfer one or more of the subgroups from a first server to at least a second server based on a determined load of the first server and the at least second server.

In yet another aspect of the invention, a computer program product comprises a computer usable medium having readable program code embodied in the medium. The computer program product includes at least one component to: determine a relationship amongst a plurality of objects; segment the objects into optimized subgroups based on the relationships; and apportion the optimized subgroups amongst a plurality of servers based on server load.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention is directed to providing a system and method of use to decrease server load and, more particularly, to decrease server load by automatically determining subgroups based on object interactions and computational expenditures. By implementing this system and method of use, it is possible to automatically determine how many resources are used by the server within the VU, how many resources are used by the server external to the VU, and how different avatars and assets within the VU interact with one another. Based on these determinations, it becomes possible to estimate how much load is on a server at a given point. It also becomes possible to logically distribute the loads between one or more servers by grouping together avatars and/or assets that share common interactions. Typically this grouping allows avatars and assets that have some commonality to be located on the same server. By being grouped on the same server, avatars can more efficiently use their resources and communicate with other avatars within their subgroup, as well as being able to continue interacting with avatars external to their subgroup. Moreover, assets throughout the VU may also be more efficiently utilized by being grouped together with other assets sharing a commonality, or with avatars associated with the asset. Additional benefits may include:

(i) Improved VU performance;
(ii) Improved resident satisfaction;
(iii) Protection against VU crash; and
(iv) Protection against malicious mob actions that attempt to slow the VU.

By using this system and method of use for optimizing server loads, degradation within the VU from server overload is limited. As such, users are able to continue to interact seamlessly.

System Environment

Figure 1:
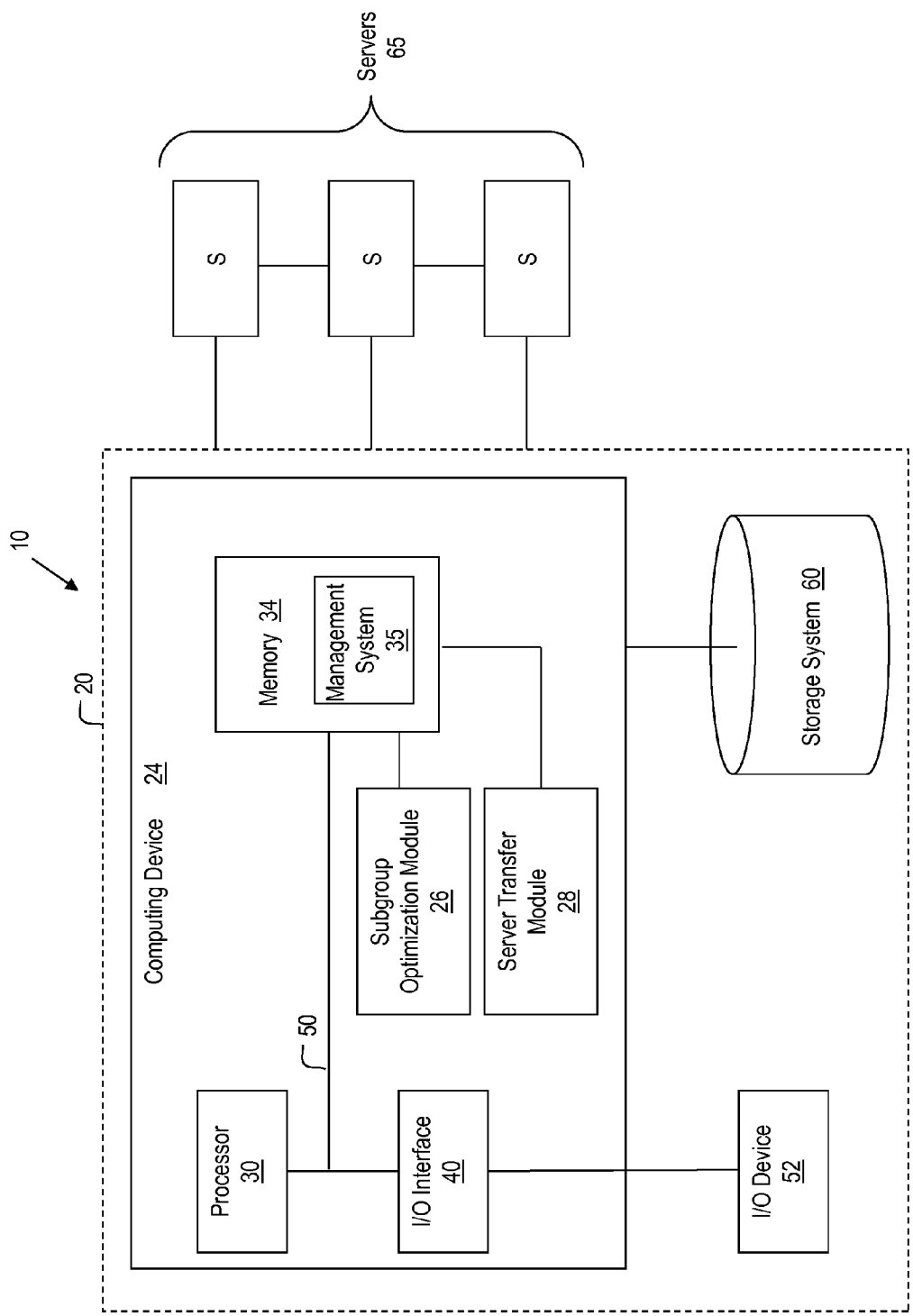
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 20 that can perform the processes described herein. In particular, the computer infrastructure 20 includes a computing device 24 that comprises a management system 35, which makes the computing device 24 operable to detect optimal alignment between subgroups via a subgroup optimization module 26 and transfer the optimal subgroups between one or more servers 65 via a server transfer module 28 in accordance with the invention, e.g., process described herein. The computing device 24 includes a processor 30, a memory 34, an input/output (I/O) interface 40, and a bus 50. The memory 34 can include local memory employed during actual execution of program code, bulk storage, and cache memories which provide temporary storage of at least some program code in order to reduce the number of times code must be retrieved from bulk storage during execution. Further, the computing device 24 is in communication with an external I/O device/resource 52 and a storage system 60. The external I/O device/resource 52 may be keyboards, displays, pointing devices, etc.

In general, the processor 30 executes computer program code, which is stored in memory 34 and/or storage system 60. While executing computer program code, the processor 30 can read and/or write data to/from memory 34, storage system 60, and/or I/O interface 40. The bus 50 provides a communications link between each of the components in the computing device 24. The I/O device 52 can comprise any device that enables an individual to interact with the computing device 24 or any device that enables the computing device 24 to communicate with one or more other computing devices using any type of communications link.

The computing device 24 can comprise any general purpose computing article of manufacture capable of executing computer program code installed thereon (e.g., a personal computer, server, handheld device, etc.). However, it is understood that the computing device 24 is only representative of various possible equivalent computing devices that may perform the processes described herein. To this extent, in embodiments, the functionality provided by computing device 24 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 20 is only illustrative of various types of computer infrastructures for implementing the invention. For example, in embodiments, the computer infrastructure 20 comprises two or more computing devices (e.g., a server cluster) that communicate over any type of communications link, such as a network, a shared memory, or the like, to perform the process described herein. Further, while performing the processes described herein, one or more computing devices in the computer infrastructure 20 can communicate with one or more other computing devices external to computer infrastructure 20 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Moreover, it should be understood that the computer infrastructure may be supported, maintained, provided, and deployed by a service provider on a fee and/or subscription basis. Still yet, any of the components of the present invention could be deployed, managed, serviced, etc., by a service provider who offers to decrease server load by automatically determining subgroups based on object interactions and computational expenditures.

Processes of the Invention

Figure 2:
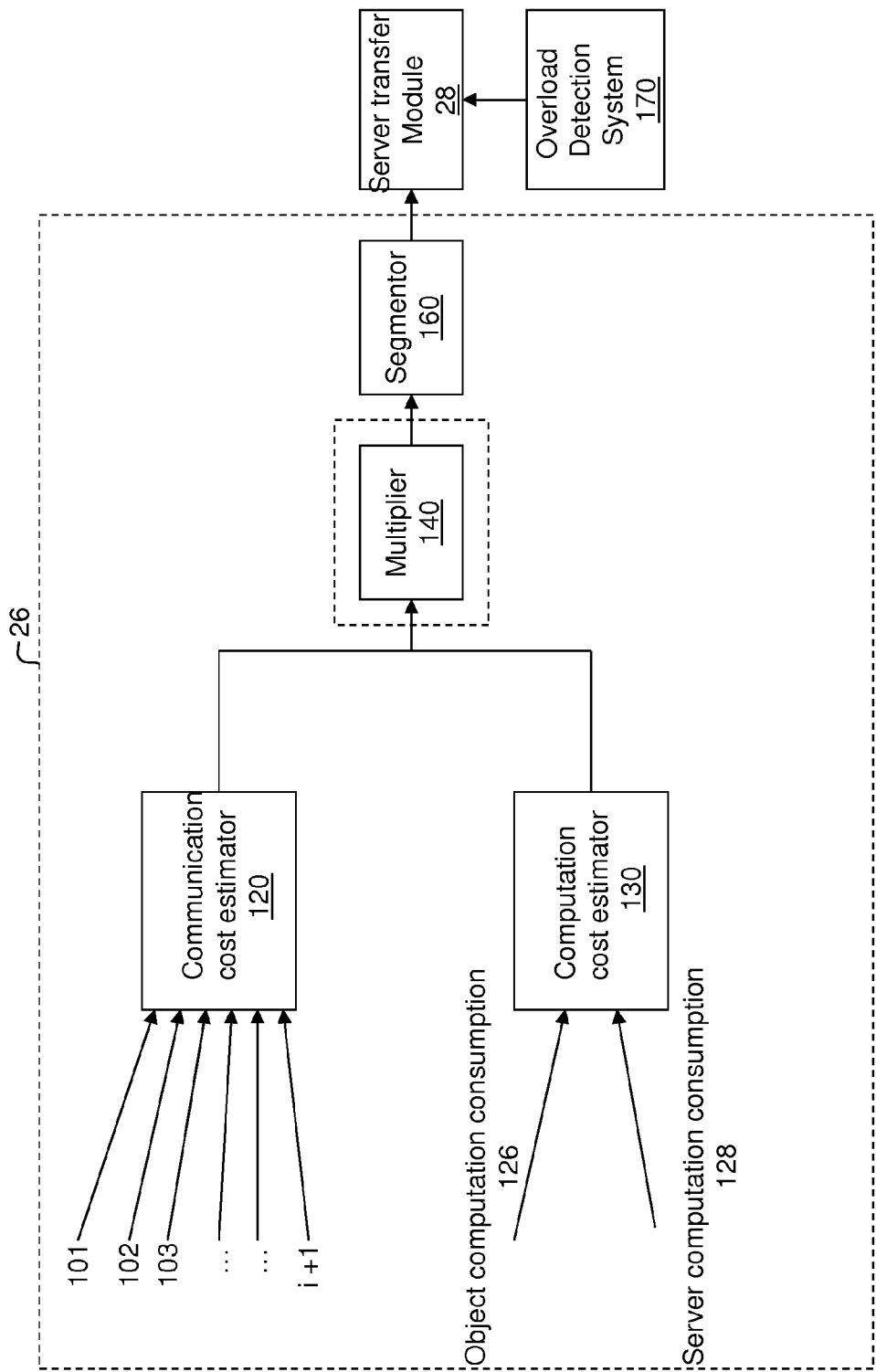
FIG. 2 shows a block diagram for implementing aspects of the subgroup optimization module and the server transfer module in accordance with the invention.

FIG. 2 is a block diagram of the invention. FIG. 2 may equally represent a high-level flow diagram or process flow chart implementing steps of the invention having the infrastructure of FIG. 1. In the case of a flow diagram, the steps of FIG. 2 may be implemented and executed from either a server, in a client server relationship, or they may run on a user workstation with operative information conveyed to the user workstation to determine optimal subgroups to decrease server load. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

FIG. 2 shows a subgroup optimization module 26, in combination with a server transfer module 28 and an overload detection system 170 which is discussed in further detail with reference to FIGS. 3-8, avatars and assets in a VU are grouped into optimal subgroups by the subgroup optimization module 26. When an avatar participates in a VU, the avatar forms a number of relationships, or interactions 101, 102, 103 . . . i+1, with one or more additional avatars or assets in the VU. These interactions 101, 102, 103 . . . i+1 are analyzed and a result is produced by a communication cost estimator 120. Additionally, object computation consumption 126 and server computation consumption 128 are analyzed and a result is produced by the computation cost estimator 130 based off of the object computation consumption 126 and/or the server computation consumption 128. The result from the communication cost estimator 120 is combined with the result from the computation cost estimator 130 to obtain a value. A multiplier 140 may or may not be applied to this value. The value is then analyzed by a segmentor 160, which optimally segments avatars and/or assets into subgroups based on their communications and computational resources. After the segmentor 160 creates one or more subgroups, the subgroups are transferred by the server transfer module 28 to a different server, or alternatively the subgroups may remain on the original server.

The process outlined above may be done periodically according to a predetermined schedule. However, if server load reaches, or is about to reach, a predicted point, then an overload detection system 170 may be used to reallocate server load without using the subgroup optimization module 28. In this case, subgroup determination is performed by the overload detection system 170 and subgroups are transferred by the server transfer module 28 to different servers, or alternatively the subgroups may remain on the original server.

Figure 3:
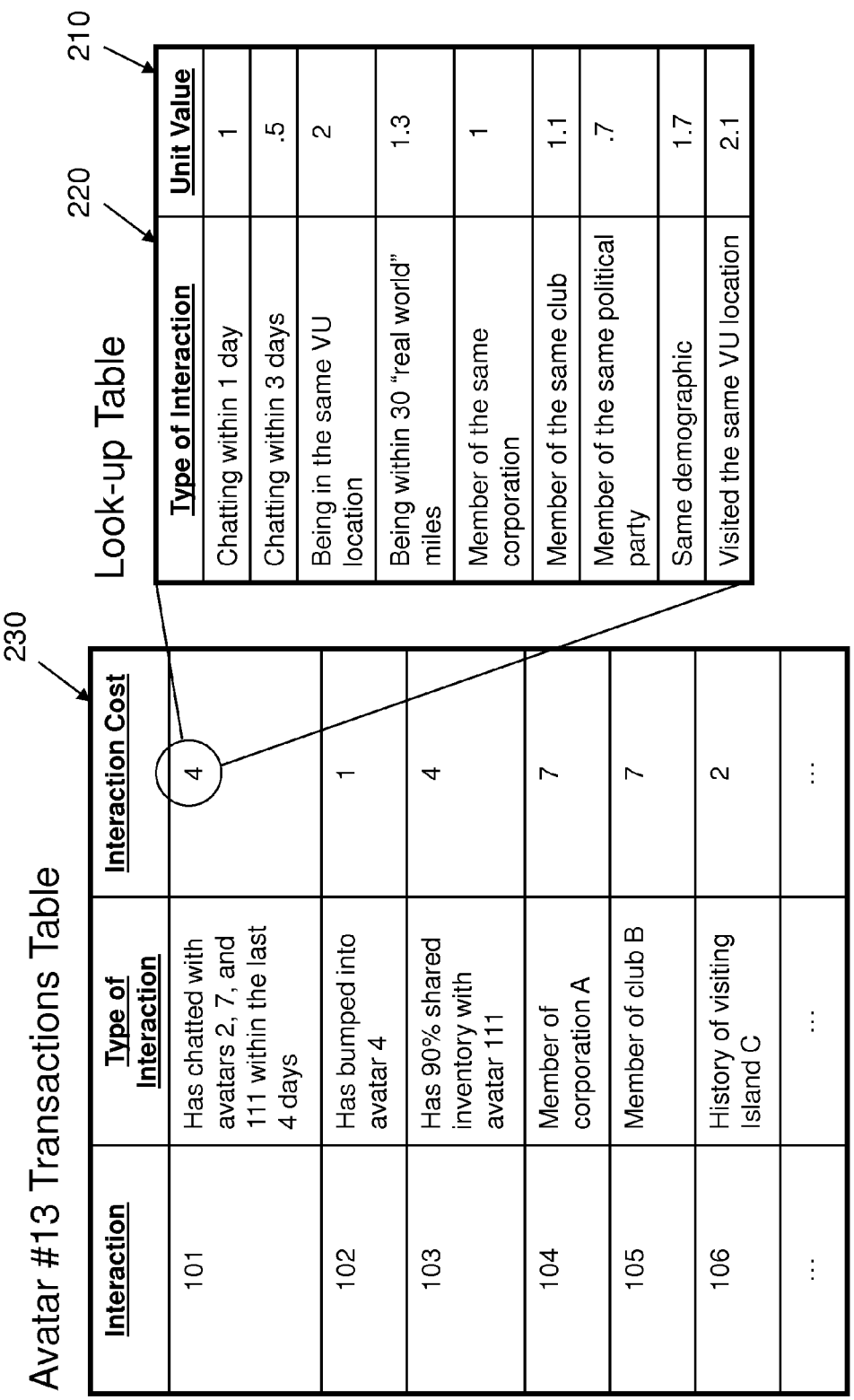
FIG. 3 shows a table illustrating hypothetical avatar transactions and interaction costs based in part on a transaction look-up table in accordance with the invention.

FIG. 3 further illustrates the process of estimating the communication cost used in FIG. 2. The interactions 101, 102, 103 . . . i+1 in FIG. 2 may be current or old interactions and/or relationships. The interactions may include, but are not limited to, "real world" geographic location, friend or buddy lists, corporate or organizational interactions, shared interests, shared inventory, recent interactions, and other mechanisms that would link one avatar to another avatar such as real-time interactions, e.g., chatting via audio and instant message communication. Each interaction 101, 102, 103 . . . i+1 is analyzed and interactions 101, 102, 103 . . . i+1 that meet predetermined criteria are assigned a unit value 210 when they occur. The unit value 210 may be stored in a number of data structures including an array, list, or table; for purposes of illustration, a table will be used as the data structure in this example. Unit values 210 associated with an interaction 101, 102, 103 . . . i+1 may be applied to avatars and/or assets in the VU. These unit values 210 may vary depending on the type of interaction 220 and when the interaction 101, 102, 103 . . . i+1 occurred. In one embodiment, interactions 101, 102, 103 . . . i+1 may be accrued over a time window that is chosen by the VU administrator to optimize the rate at which communication cost values change. Unit values 210 may then be used to establish an interaction cost 230 for each interaction 101, 102, 103 . . . i+1. For example, avatars or assets that interact more frequently may obtain a higher interaction cost 230, whereas infrequent interactions 101, 102, 103 . . . i+1 may result in a lower interaction cost 230.

For example, FIG. 3 illustrates how avatar #13 interacts with other avatars and how interactions 101, 102, 103 . . . i+1 are stored in a transaction table. Once an interaction is stored, a look-up table may be consulted to give a certain unit value 210 to each interaction. Unit values 210 may vary depending on the importance of the interaction, the length of the interaction, when the interaction occurred, as well as a number of alternative factors. Alternatively, each interaction may have the same unit value 210 or no unit value 210 at all.

Unit values 210 may also be assigned to interactions between an avatar and an asset. For example, if an avatar #13 frequently uses an asset within a VU, such as a car #61, then a unit value 210 may be assigned each time the avatar drives car #61. This interaction may be kept in the transaction table for avatar #13, or in the transaction table for car #61. In alternative embodiments, the interaction may be kept in the transaction tables for both avatar #13 and car #61.

Unit values 210 may also be assigned to interactions between assets. For example, if avatar #13 frequently drives car #61 to and from a virtual coffee store #2, then a transaction cost is associated between avatar #13 and coffee store #2, as well as between car #61 and coffee store #2. Therefore, assets may interact with one another.

Once a unit value 210 is determined, that unit value 210 is applied to the interaction to determine an interaction cost 230 for that interaction. If an interaction cost 230 is high enough, then the server transfer module 28 may be triggered.

Once an interaction cost 230 for an interaction is determined, that interaction cost 230 is combined with other interaction costs 230 involving the same avatar or asset (if such interaction costs 230 exist) and a communication cost estimator 120 is used to estimate the total communication cost, or communication load. For example, in FIGS. 3 and 4, avatar #13 has bumped into avatar #111 within the last four days and also shares 90% of his inventory with avatar #111. These interaction costs 230 would be combined by the communication cost estimator 120 to form an estimated communication cost, or weighted link, 325 (See FIG. 4) between avatar #13 and avatar #111. If it was also determined that avatar #111 is a member of corporation A and/or belongs to club B then the weighted link 325 between avatar #13 and avatar #111 would become stronger. Conversely, if avatar #13 and avatar #111 had only bumped into each other within the last 3 days, then the weighted 325 link between avatar #13 and avatar #111 would not be as strong. A similar approach is taken when estimating communication costs for an asset. This approach can be represented using the hypothetical graph in FIG. 4, wherein each avatar or assets is represented by a node 305 which has a weighted link, or edge, 325 to one or more different avatars. Each weighted link, or edge, 325 between two nodes 305 represents the estimated communication cost.

Referring back to FIG. 2, while the avatar is interacting in the VU, it is using server resources. These resources may include different assets that the avatar has acquired, or details about the avatar. The total server resources consumed through interactions between assets and/or avatars are combined in a predetermined way to obtain an object computation consumption 126. This object computation consumption 126 is then used by the computation cost estimator 130 to determine a total computation cost, or computation load, on a server 65. For example, in one embodiment, an object computation cost 126 may be assigned to each avatar and asset in the VU. This object computation cost 126 may be measured and accrued over time such that a running average is kept, where the running average is represented by the computations per unit time that the avatars or assets have consumed. Avatars that move frequently, change appearance frequently, or perform numerous gestures, or other computational intensive actions, may accrue a larger computation cost. The time window in which the running average is performed can be parameterized by the VU administrator for optimal performance. Generally, long time windows may result in slower changes to computation cost values, while shorter time windows may result in more rapid changes to computation cost values. The object computation consumption 126 is used to estimate the computation cost, or computation load, on the server 65.

In a further embodiment, server computation consumption 128 may be used in addition to object computation consumption 126 to estimate the computation cost. Server computation consumption 128 includes resources that are used external to the VU, whereas resources used by the avatar or asset would be internal to the VU. External resources that may be included in determining the server computation consumption 128 include running processes external to the VU but on the same server, such as file system indexing processes, user terminals, file transfers, etc. These server computation consumptions 128 affect how many CPU cycles and how much memory is available on a server.

In an embodiment, object computation costs 126 and server computation costs 128 may be estimated using the processes described above. These costs may be combined in a predetermined way via a computation cost estimator 130. The computation cost estimator 130 assigns the result from the combination to the avatar as the avatar's total computation cost or to the asset as the asset's total computation cost. This can be represented using the hypothetical graph in FIG. 4, wherein each edge 325 is an estimated communication cost associated with an avatar, and each node 305 is an estimated computation cost.

In another embodiment, the communication cost and the computation cost may be combined as a function of one another to determine the server load time. The server load time is representative of how tightly linked together one or more avatars and/or assets are and how much one or more of the avatars and/or assets are consuming in total resources. Based on these determinations, a segmentor 160 will determine an optimal alignment to group avatars together. The segmentor 160 considers a number of factors in making this determination. For example, the segmentor 160 may try to group together avatars that interact frequently (i.e., have high communication costs). In one embodiment, users interacting in real-time by chatting or engaging in physical activities, such as virtual tennis, may be grouped together. By grouping these avatars and assets together, the avatars and assets will remain on the same server 65. This allows the avatar's interactions 101, 102, 103 . . . i+1 to be faster than if the avatars and assets were on different servers 65 or in different groups. Alternatively, the optimal alignment may be to have unequal server loads on the servers 65.

In a further embodiment, optimal alignment may be obtained by applying an optional multiplier 140 to the result obtained from the communication cost estimator and the computation cost estimator. The multiplier 140 may act as a way to increase or decrease the value that is used by the segmentor 160 and server transfer module 28 in determining optimal server load. For example, in one embodiment an avatar or asset may obtain a multiplier 140 because of frequent interactions 101, 102, 103 . . . i+1 within the VU, by paying for a premium membership, or other predetermined methods of reaching an elevated status. This multiplier 140 is applied to the combined estimated communication costs and estimated computation costs such that the multiplier 140 causes the combined estimated communication costs and estimated computation costs to appear to have a higher load, compared to its actual load. This heightened calculated load is then used by the segmentor 160 when determining optimal subgroups and where to place the subgroups within the multitude of servers 65. The multiplier 140 may provide a preference to one subgroup over another when transmitting subgroups to different servers 65. The multiplier 140, for example, may result in a preferred subgroup being relocated to a faster server, a server with a lower load, etc., in order to maximize the user's VU experience.

In alternate embodiments, avatars and/or assets in a group having a member with a multiplier 140 may be grouped on the same server according to their multiplier value, whereas avatars and/or assets with no group member having a multiplier 140 may be grouped on a different server. Different embodiments may allow the multiplier value to vary depending on user status or other outside factors.

Figure 4:
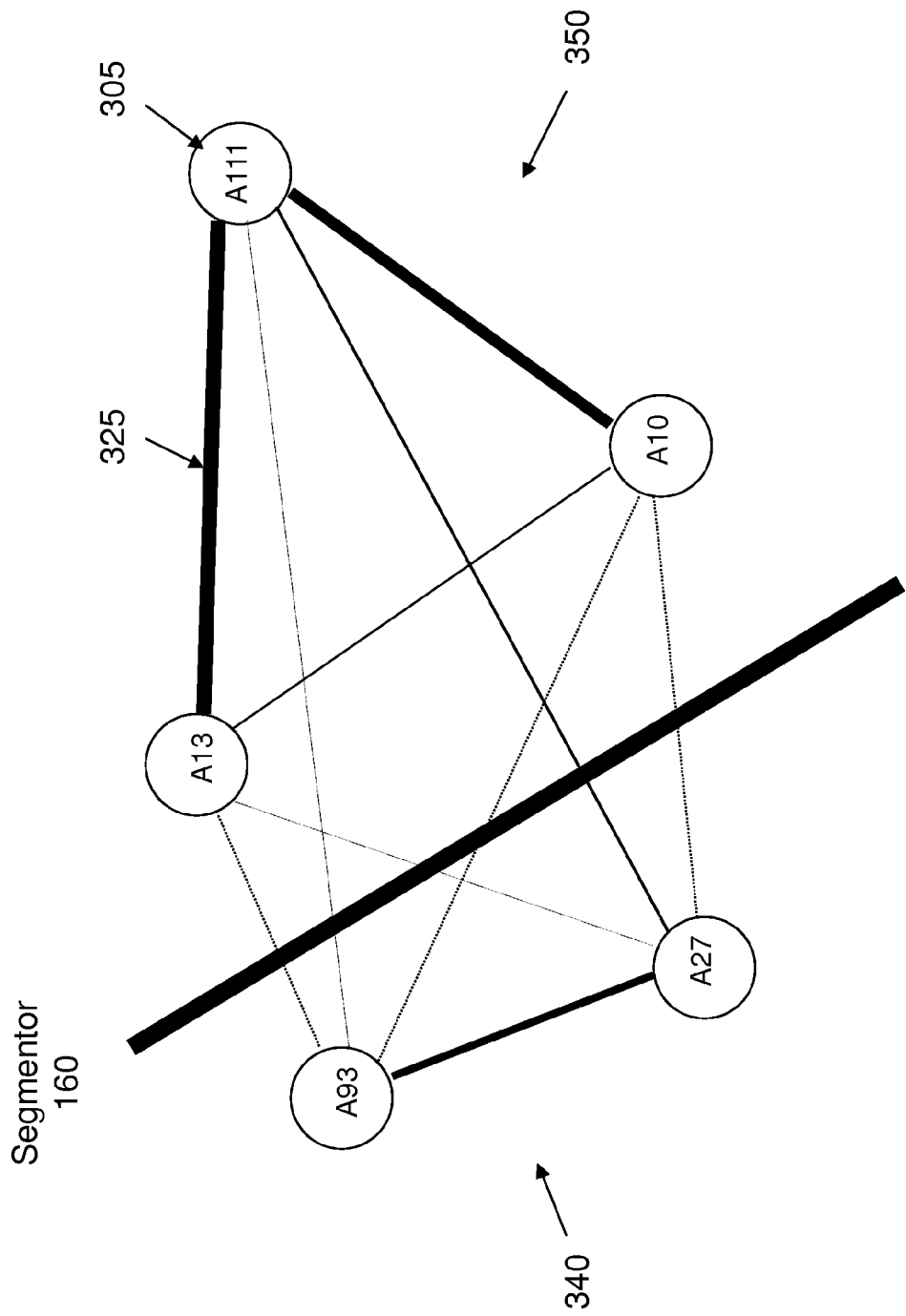
FIG. 4 shows a graph illustrating communication costs, computation costs, and a segmentor in accordance with the invention.

FIG. 4 graphically represents portions of FIG. 2 using a series of edges 325 and nodes 305 to represent a graph. The edges 325 in the graph represent the communication costs between avatars. The stronger the edge 325 between avatars, the stronger the communication cost as represented by the thicker lines. The nodes 305 in the graph represent the computational cost for an avatar whereby the nodes 305 in this illustrative graph are labeled according to an avatar identification. Once the segmentor 160 determines the optimal way to group avatars together, the segmentor 160 will segment one or more avatars into an optimal grouping. Each subgroup 340, 350 is then placed on a respective server via the server transfer module 28. In one embodiment, this may be done as a function of how much load is already on the server and how much load is on other servers 65.

Further embodiments may also be explained using FIG. 4. In one embodiment, instead of having each node represent an avatar, each node may alternatively represent an asset. Therefore, the edges between the assets indicate the strength of the communication costs between the assets. The stronger the communication cost between two assets, the thicker the line in the graph.

Other embodiments may include nodes within the graph that are represented by a plurality of intermingled avatars and assets. For example, two avatars A13 and A10 may both share the same desk A111 in a virtual classroom, only on alternating days. Therefore, both avatars A13 and A10 have relatively strong communication costs with the desk A111, which are represented by the edges in the graph. However, avatar A13 and A10 may have little if any interactions with each other. Therefore, avatars A13 and A10 may be grouped together based on each avatar's interactions via the desk A111, i.e., via an asset.

Figure 5:
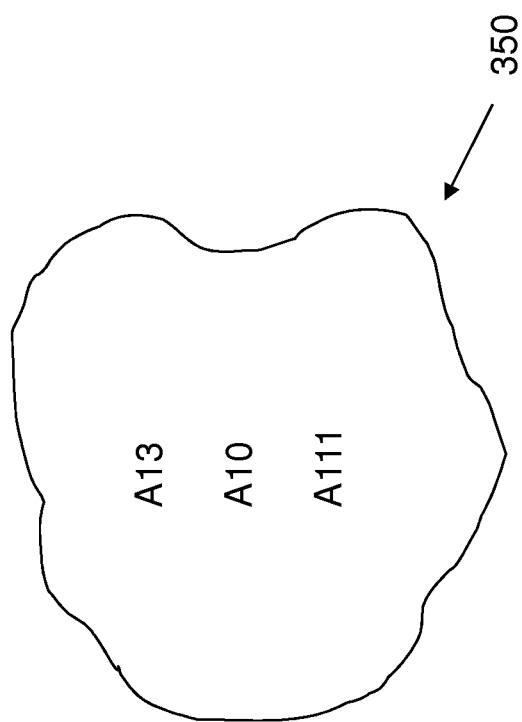
FIG. 5 shows the illustrative graph from FIG. 4 after the graph is segmented by the segmentor in accordance with the invention.
Figure 5:
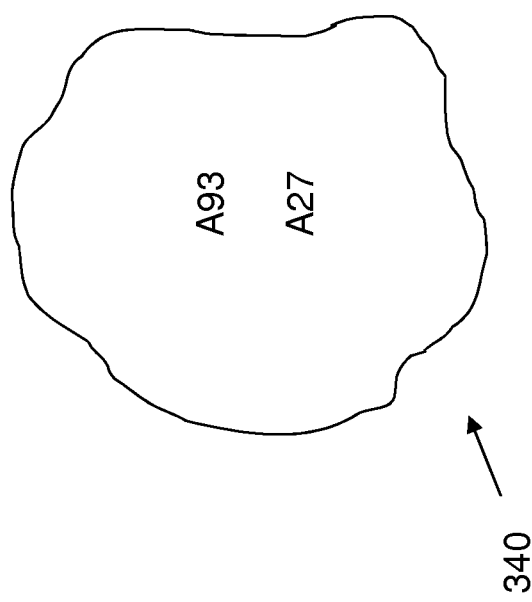

FIG. 5 illustrates how the different subgroups 340, 350 in FIG. 4 are separated prior to being transferred by the server transfer module 28. More specifically, the segmentor 160 in FIG. 4 has already optimally determined that certain nodes should be grouped together as a result of their communication costs and computation costs. Based on this determination, the segmentor 160 splits the nodes into two optimal subgroups 340, 350. These optimal subgroups are illustrated in the example in FIG. 5. In this example, the segmentor 160 determined one optimal subgroup 340 should comprise of nodes A93 and A27. The segmentor 160 further determined that another optimal subgroup 350 should comprise of nodes A13, A111, and A10. These subgroups 340, 350 may remain on the same server, may be transferred to different servers, or one subgroup may remain on the server while the other subgroup is transferred to a different server based on existing server loads.

Figure 6:
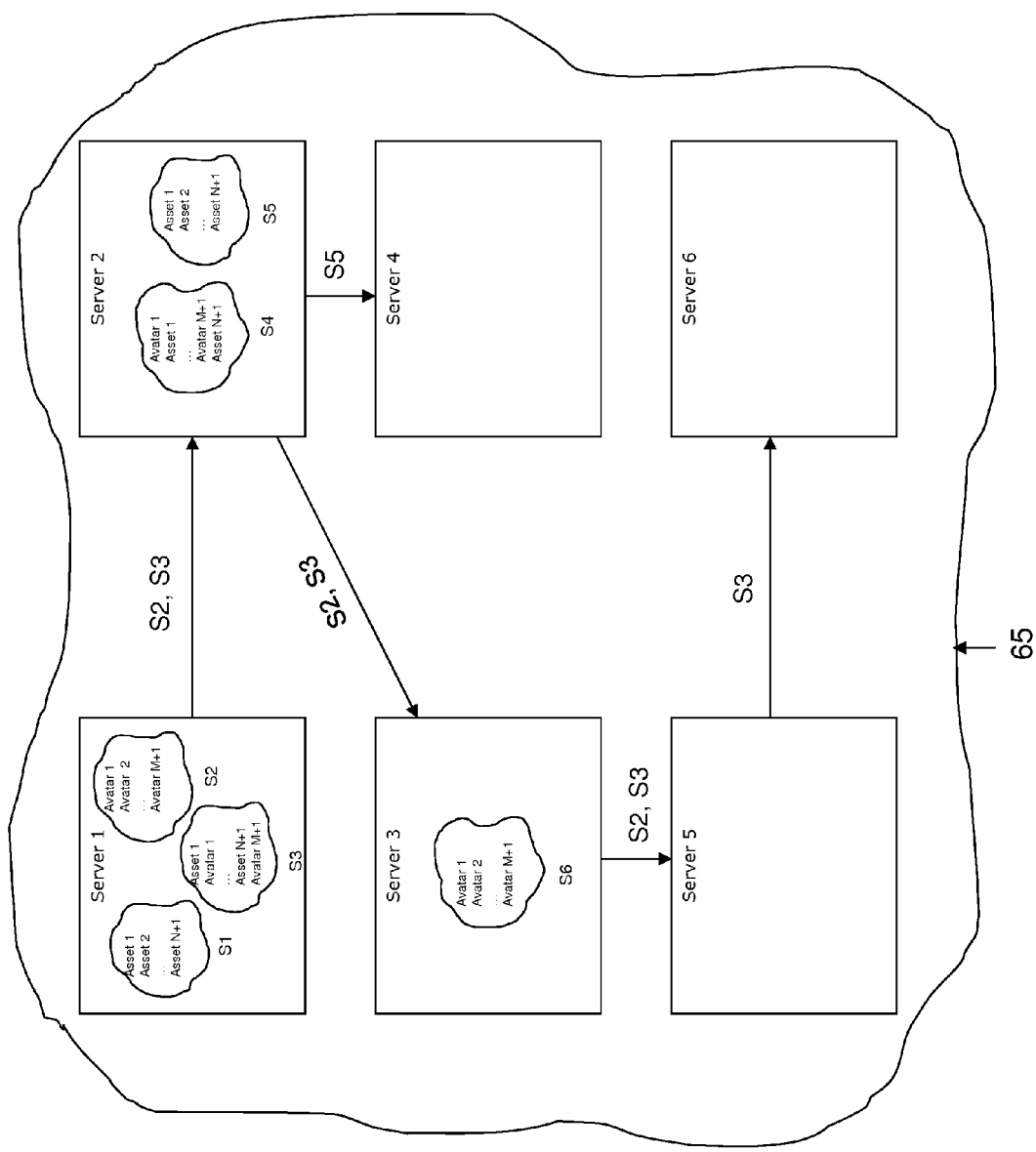
FIG. 6 shows the server transfer module transferring optimal subgroups between servers in accordance with the invention.

FIG. 6 illustrates a plurality of servers 65 used to host a VU. More specifically, FIG. 6 illustrates servers 65 within the VU wherein at least one server includes one or more subgroups of avatars and/or assets S1-S6. In the example illustrated in FIG. 6, the costs associated with a subgroup have already been determined and optimal subgroups S1-S6 have been formed according to the determination. The subgroups S1-S6 are then sent to the server transfer module (See FIG. 2). The server transfer module (See FIG. 2) consults the subgroup optimization module (See FIG. 2) and receives a list of subgroups S1-S6 to transfer to a secondary server. In another embodiment, the server transfer module 28 may obtain a list that requires no transfers to be performed, all subgroups S1-S6 to be transferred, or any number of transfers less than the total number of subgroups S1-S6 on the server. Once the list of subgroups S1-S6 is obtained, the server transfer module 28 transfers the avatars and/or assets to a secondary server. The transfer may be performed using known VU transferring technology or non-VU transferring technology. In one embodiment, the transfer may appear seamlessly to the user. In a further embodiment, a user may be provided with the choice to transfer before the transfer is carried out.

In the example illustrated in FIG. 6, the avatars and assets on server 1 have been split into three different subgroups S1, S2, S3. Similarly, the avatars and assets on server 2 have been split into two different subgroups S4, S5. In this example, avatars on server 3 have been grouped into a single subgroup S6, and no subgroups exist on server 4, server 5, or server 6. In the embodiment illustrated in FIG. 6, the server transfer module 28 will transfer the segmented subgroups S1-S6 to one or more servers 65. For example, if server one has three subgroups S1, S2, S3, and it is determined by the subgroup optimization module that the server load on server 1 is disproportionate to the server loads on other servers hosting the VU, then the server transfer module 28 will transfer subgroups S2, S3 from server 1 to another server. In the example illustrated in FIG. 6, subgroup S2 and subgroup S3 are considered overload on server 1 and are transferred to server 2. Server 2 already has subgroup S4 and subgroup S5, which is determined to be a disproportionate load on server 2 as compared to the other servers 65 hosting the VU. Therefore, server 2 will not take the load from server 1 and the load from server 1 will be transferred to server 3. Additionally, server 2 will try to more optimally apportion its existing load by transferring subgroup S5 to server 4. Once the load from server 1 reaches server 3, it is determined whether server 3 can take the load such that server 3 and the other servers 65 hosting the VU will be optimized.

Figure 7:
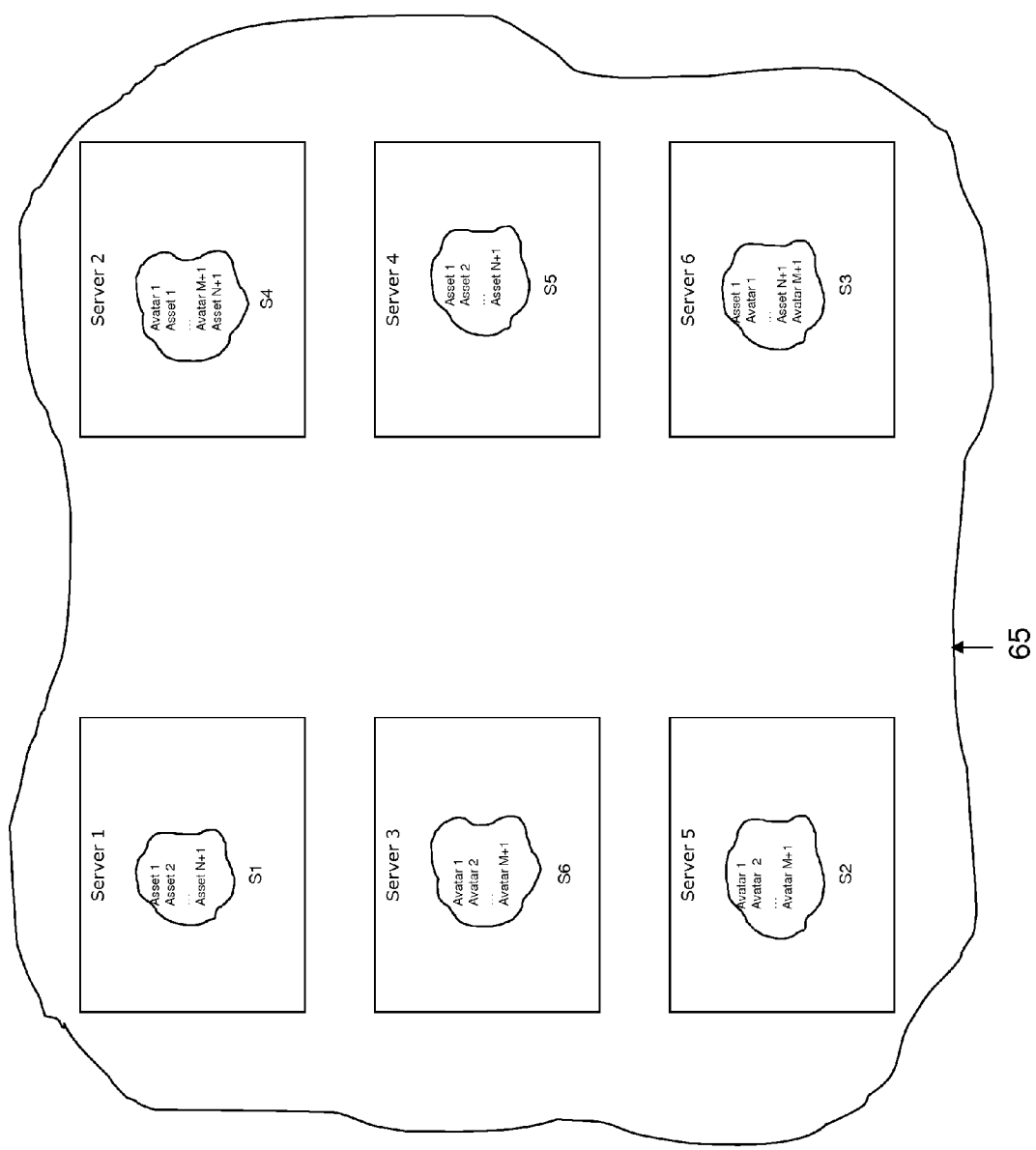
FIG. 7 shows the servers from FIG. 6 after the server transfer module has transferred optimal subgroups between servers in accordance with the invention.

In this example, it is determined that the load on server 3 would be disproportionate if subgroup 2 and subgroup 3 were placed on server 3 with its already existing load of subgroup S6. Therefore, subgroup 2, and subgroup 3 are transferred to server 5, wherein it is determined that server 5 can optimally host at least one subgroup S1-S6. However, since server 6 could also host at least one subgroup S1-S6, the server optimization module determines that subgroup S2 should be transferred to server 5 and subgroup S3 should be transferred to server 6. This series of transfers is illustrated in FIG. 6 and the final outcome from this series of transfers by the server transfer module 28 is illustrated in FIG. 7. Because different server transfer modules 28 may be used, the actual process of transferring one subgroup S1-S6 to another server may differ from this example.

In another embodiment, each transfer by the server transfer module 28 is given a transfer cost. A transfer cost may be represented by the amount of resources that are needed to transfer a subgroup from one server to another server. If the amount of resources to transfer a subgroup to another server is high compared to the degree of optimization that would result from the transfer, then the optimal outcome may be to forego transferring the subgroup to another server. Additional embodiments may forgo transferring a subgroup from one server to another server if optimization would be minimum regardless of transfer costs.

A number of alternative embodiments may result from the description above. For example, in one embodiment the subgroup optimization module 28 may be run on a periodic interval (e.g., every five or ten seconds) whereby the estimated computation cost and the estimated communication cost are combined prior to the segmentor 160. The period interval may be based on real time measurements or on logical time within the VU. However, in another embodiment, there may be a sudden increase in load on one or more servers 65 such that re-optimization is needed between the periodic intervals.

Figure 8:
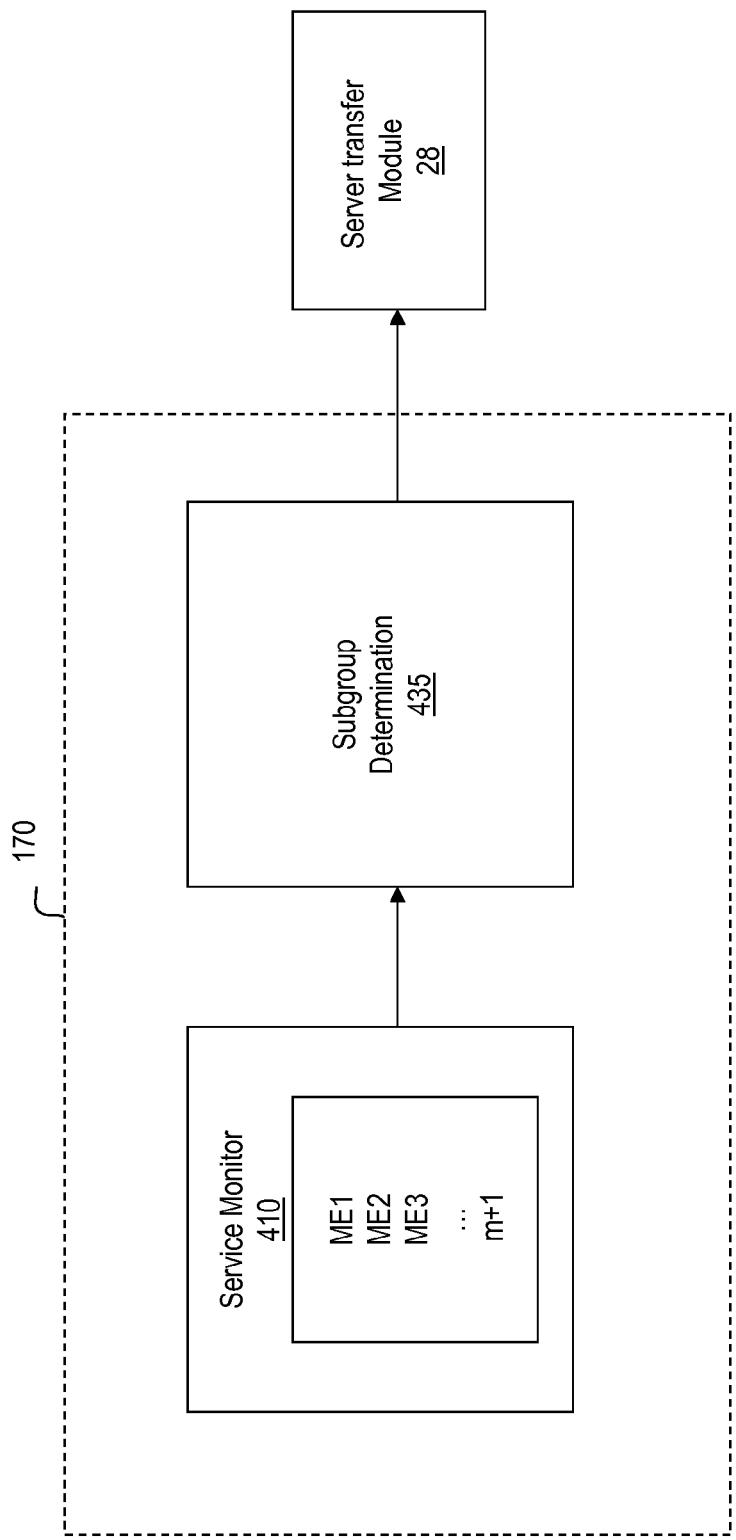
FIG. 8 shows an illustration of an overload detection system and server transfer module in accordance with the invention.

FIG. 8 illustrates one embodiment, wherein an overload detection system 170 determines if a server is overloaded beyond a predefined threshold value for a predefined time period. The overload detection system 170 includes a server monitor 410. The server monitor 410 obtains metering messages whenever a metering event ME1, ME2 . . . m+1 occurs. Metering messages are sent by one or more of the servers 65 hosting the VU, and informs the server monitor 410 of a metering event ME1, ME2 . . . m+1. A metering event ME1, ME2 . . . m+1 may include, but is not limited to, chatting, bumping, sharing, visiting a geographic location, or stating membership of a particular group. The server monitor 410 obtains the metering events ME1, ME2 . . . m+1, which are then used to determine if a threshold has been met. A threshold may be set by an administrator based on any one of a number of factors including memory usage, CPU utilization, etc. A threshold value may be influenced by factors including textures within the VU, geometric information, streaming media, etc. If the threshold is met or surpassed for more than the predefined time period then subgroup determination 435 is performed. Subgroup determination 435 may be extemporaneous and/or based on data obtained from the threshold values. Upon completion of the subgroup determination 435, the subgroups are sent to the server transfer module 28 (described above.)

Another embodiment may employ an overload detection system 170 that engages the server transfer module 28 when the load is nearing the threshold instead of after the threshold has been met. A similar embodiment may determine that an event is going to happen within the VU that will cause large computation costs and/or communication costs to occur. This, in turn, may cause the server transfer module 28 to be engaged so that server load can be better apportioned to account for the upcoming influx in server load.

In alternative embodiments, an avatar may have communication costs between himself and another avatar, however, the communication cost may not be strong enough to keep the avatars together in the same subgroup or to have the avatars moved to another server. If avatars with minimum interactions are separated into different subgroups, then the refresh rate, i.e., the rate in which images are regenerated on the screen, may be decreased to a lower computation load on the servers 65. For example, an avatar in a subgroup having a refresh rate of one second will be able to see changes, actions, and/or fluctuations from avatars or assets within its subgroup every second. However, if the avatar is looking at another avatar or asset outside of its subgroup, then the refresh rate may be three seconds. This example implies that an avatar would not be able to observe actions by other avatars or assets outside of its subgroup as fluidly as actions by those inside of the avatar's subgroup. By not having to refresh an avatar's, or asset's, actions as frequently, server load can be decreased.

Alternate embodiments, may have the refresh rate differ if an avatar or asset in a subgroup on one server observes an action coming from an avatar or object on a different server, as opposed to coming from a different subgroup on the same server.

Additionally, other embodiments may include a refresh rate that differs between avatars or assets in the same subgroup. For example, if the segmentor (See FIG. 2) determines that the optimal grouping includes a subgroup having three avatars, then the segmentor (See FIG. 2) will group those three avatars together. Within that subgroup, a first avatar may have a strong communication cost with the second and third avatars respectively; however, the second and third avatars may rarely if ever communicate or interact with one another. In this example, a faster refresh rate may be used for the first avatar so he can more fluidly see interactions with the second and third avatars, whereas, a lower refresh rate may be used between the second and third avatars since their interactions are much less frequent and do not need to appear as fluid. One skilled in the art would understand that this is an illustration and may be applied to multiple avatars and/or assets in a subgroup and that multiple refresh rates may be used between avatars and/or assets in the same subgroup, different subgroups on the same server, and different subgroups on different servers.

Other embodiments may permit refresh rates to be faster for one avatar and not for another avatar. For example, if an avatar attends a packed concert in a VU then a refresh rate of one half second may be used so that the avatar can fluidly see everything that happens on stage during the concert. However, a slower refresh rate of ten seconds may be used for the performer seeing the avatar's actions in the crowd. This permits refresh rates to be used to decrease server load by not having to refresh the avatar in the crowd as frequently. Further embodiments may adjust refresh rates differently to decrease server load.

In yet another embodiment, an avatar that has an initially weak communication cost associated with himself and another avatar or asset may increase the communication cost by increasing interactions with the other avatar or asset. New interactions, and likewise new resource expenditures, are continuously evaluated and can cause one or more subgroups to be reapportioned to optimize server load. For example, if avatar #13 initially bumps into avatar #4 then a certain interaction cost 230 will be assigned; however, this interaction alone may not be strong enough to cause avatar #13 and avatar #4 to be grouped together in the same subgroup. If avatar #13 subsequently starts to chat with avatar #4 then the interaction cost will increase, which in turn increases the estimated communication cost between avatar #13 and avatar #4. The subgroup optimization module 26 will take this change in communication cost into consideration when reapportioning and may determine that avatar #13 and avatar #4 should be located in the same subgroup. In another embodiment, the computation cost is continuously evaluated in a similar manner.

A further embodiment may include an avatar strengthening his communication cost with another asset. For example, if avatar #13 previously test drove car #61, then avatar #13 may increase his interaction costs with car #61 by washing car #61, purchasing car #61, or by continuing to test drive car #61. These increased interaction costs in turn increase the estimated communication cost between avatar #13 and car #61. A similar adjustment in communication costs may occur between multiple assets.

In another embodiment, the invention provides a business method that performs the process steps of the invention on a subscription, advertising, and/or fee basis. That is, a service provider, such as a Solution Integrator, could offer to decrease server load by automatically determining subgroups based on object interactions and computational expenditures. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed is:

1. A system for reducing server loads, comprising:
a plurality of servers;
a subgroup optimization module configured to:
  assign respective costs to interactions amongst a plurality of objects in a virtual universe; and
  segment the plurality of objects into subgroups based on the respective costs of the interactions; and
a server transfer module configured to apportion one or more of the subgroups between the plurality of servers,
wherein the assigning the respective costs to the interactions comprises assigning one of a plurality of unit values to each of the interactions, and wherein each of the plurality of unit values are based on interaction importance and interaction length.

2. The system for reducing server loads of claim 1, wherein the plurality of objects include at least one of a plurality of avatars and a plurality of assets.

3. The system for reducing server loads of claim 1, wherein one or more of the interactions are real-time communications between two or more of the plurality of objects.

4. The system for reducing server loads of claim 1, wherein the subgroup optimization module further comprises a communication cost estimator configured to assign respective communication costs to the interactions.

5. The system for reducing server loads of claim 4, wherein the communication cost estimator is further configured to determine the respective communication costs assigned to the interactions based on respective characteristics of the interactions.

6. The system for reducing server loads of claim 1, wherein the subgroup optimization module is further configured to:
assign a respective communication cost to the interactions based on respective characteristics of the interactions; and
determine a total communication cost for a link between a first object and a second object based on the respective communication cost of one or more of the interactions that involve the first object and the second object.

7. A method for reducing server load, comprising:
determining interactions amongst a plurality of objects in a virtual universe;
assigning respective interaction costs to the interactions;
segmenting the plurality of objects into subgroups based on the respective interaction costs; and
apportioning one or more of the subgroups between a plurality of servers based on a load of each of the plurality of servers
wherein the interactions are assigned unit values that are based on (i) importance of the interactions, (ii) length of the interactions, and (iii) when the interactions occurred.

8. The method for reducing server load of claim 7, wherein the plurality of objects include at least one of a plurality of avatars and a plurality of assets.

9. The method for reducing server load of claim 7, wherein one or more of the interactions are real-time communications between two or more of the plurality of objects.

10. The method for reducing server load of claim 7, wherein the assigning the respective interaction costs to the interactions comprises assigning a respective communication cost to the interactions.

11. The method for reducing server load of claim 10, wherein the assigning the respective communication cost to the interactions comprises determining the respective communication costs based on respective characteristics of the interactions.

12. A computer program product comprising a computer-readable storage device having readable program code stored on the storage device, wherein the computer program product includes at least one component operable to:

determine interactions amongst a plurality of objects in a virtual universe;

assign respective interaction costs to the interactions;

segment the plurality of objects into a plurality of subgroups based on the respective interaction costs; and apportion one or more of the plurality of subgroups between a plurality of servers based on a load of each of the plurality of servers, wherein the interactions are assigned unit values, the computer-readable storage device comprises one of: a magnetic tape, a removable computer diskette, compact disk-read only memory (CD-ROM), compact disk-read/write (CD-R/W) and DVD, and the unit values depend on (i) importance of the interactions, (ii) length of the interactions, and (iii) when the interactions occurred.

* * * * *